United States Patent [19]

Sorokin

[11] 4,154,336

[45] May 15, 1979

[54] VERTICALLY ADJUSTABLE CONVEYOR TRACK

[76] Inventor: Jury L. Sorokin, ulitsa Korablestroitelei, 23, korpus 1, kv. 193, Leningrad, U.S.S.R.

[21] Appl. No.: 861,411

[22] Filed: Dec. 16, 1977

[30] Foreign Application Priority Data

Dec. 27, 1976 [SU] U.S.S.R. .............................. 2439453

[51] Int. Cl.² .............................................. B65G 21/10
[52] U.S. Cl. ..................................... 198/864; 198/326
[58] Field of Search ...................... 198/326, 838, 864; 104/25, 147 R, 165

[56] References Cited

FOREIGN PATENT DOCUMENTS 501942  4/1976  U.S.S.R. ..................................... 198/864

Primary Examiner—Robert B. Reeves
Assistant Examiner—Jeffrey V. Nase
Attorney, Agent, or Firm—Fleit & Jacobson

[57] ABSTRACT

A vertically adjustable conveyor track comprises a horizontal and an inclined sections coupled by a curvilinear section. The curvilinear section of the track is made in the form of a block chain including rows of plates arranged one after another. The end faces of the plates in each row are provided with teeth which engage each other. Such a design of the track enables the adjustment of the elevation height of the track within wide limits: the track can be set in any position from the horizontal one to a position close to the vertical one. The width of the race of such a track is constant throughout its length. This reduces the wear of the rollers.

1 Claim, 3 Drawing Figures

VERTICALLY ADJUSTABLE CONVEYOR TRACK

FIELD OF THE INVENTION

The present invention relates to conveyors and more particularly to vertically adjustable conveyors. Most successfully the present invention can be used in vertically adjustable moving stairways utilized in aviation and water transport for boarding people into aircraft and ships, as well as in shipbuilding to transport the workers on board of a ship being built.

BACKGROUND OF THE INVENTION

Tracks are used as supports for conveyor slats or the stair members of moving stairway. Rollers of the conveyor slat or of the stair member move over the track surface which serves as a race. The track should provide a smooth, free of dynamic impacts, movement of the rollers over the race, when passing from a horizontal section of the track to an inclined one.

Known in the art are vertically adjustable moving stairway tracks, which comprise straight-line horizontal and inclined sections hinged to each other. An obtuse angle is formed in moving stairways using such tracks in the point of connection of the horizontal and inclined sections of their races. As a result, dynamic impacts occur, when the stair rollers move from the horizontal section onto the inclined one, which causes an increased wear of the rollers and of the race; it can also cause falling of the people being transported.

This deficiency is eliminated in the vertically adjustable moving stairway track (c.f. USSR Inventor's Certificate No. 523020) comprising a horizontal and an inclined straight-line sections coupled with a curvilinear section. The curvilinear section of the track is formed by two elements having the same radius of curvature. One of the elements has an U-shaped cross-section and is rigidly fastened to the horizontal section of the track. The other element is rigidly attached to the inclined section of the track and is slidablay mounted within the U-shaped element so that it can move longitudinally inside said U-shaped element. Thus, the curvilinear section of the track has a telescopic construction.

The upper surfaces of said elements are disposed at the same level and form, in combination, the race of the curvilinear section of the track. When the elevation height of the track is varied, the curvilinear section elements slide out from one another, whereby the length of the curvilinear section increases, while its radius of curvature remains constant.

Such a track has a limited range of variation in height because of the limited change in the length of the curvilinear section. The telescopic construction of the curvilinear section makes it possible to increase its length by not more than a factor of 1.8. Moreover, any misalignment of the inclined and horizontal sections of the track causes jamming of the curvilinear section elements, thus preventing any change in the track elevation height. This reveals low reliability of this track in service.

The width of the race along the curvilinear section of the track varies with the variation of the height of the track. As a result, when moving over the curvilinear section of the track, the stair rollers would bear upon the track, at certain instants only by a portion of their width. Moreover, it is the very curvilinear section where the load on the rollers is at the maximum. All this results in an increased wear of the stair rollers.

SUMMARY OF THE INVENTION

It is an object of the present invention to expand the range of the track height adjustment.

A further object of the present invention is to increase the track reliability.

Another object of the present invention is to decrease the wear of the step rollers.

With these and other objects in view, there is proposed a vertically adjustable conveyor track comprising a horizontal and an inclined sections coupled with a curvilinear section, wherein according to the present invention, the curvilinear section is made in the form of a block chain comprising rows of plates arranged one after another, the end faces of the plates in each row being provided with teeth engaging one another.

Such a design of the track enables the adjustment of the track height within wide limits: the track can be set in any position from the horizontal one to a position close to the vertical one. Such a track offers a race whose width is constant throughout its length, thus eliminating an accelerated wear of rollers.

Other and further objects and advantages of the present invention will be better understood from the following description taken in conjunction with the accompanying drawings illustrating a preferred embodiment of the invention, wherein:

DETAILED DESCRIPTION OF THE PREFERRED EMBODIMENT OF THE INVENTION

Figure 1:
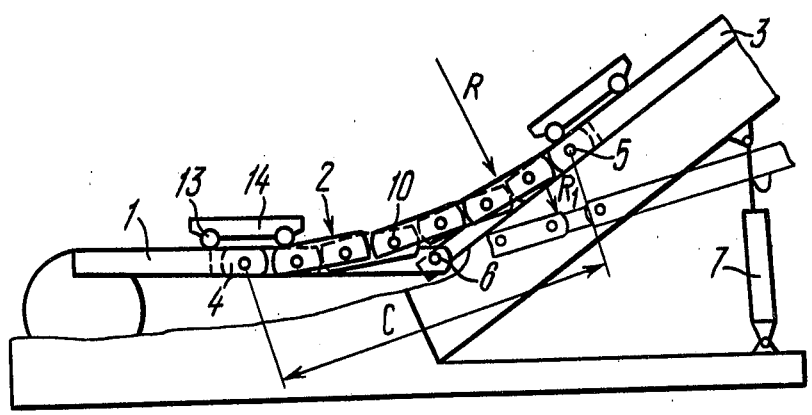
FIG. 1 is a side elevation view showing schematically the track according to the invention.
Figure 2:
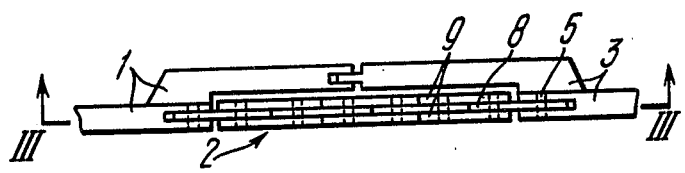
FIG. 2 is a view along arrow A in FIG. 1.
Figure 3:
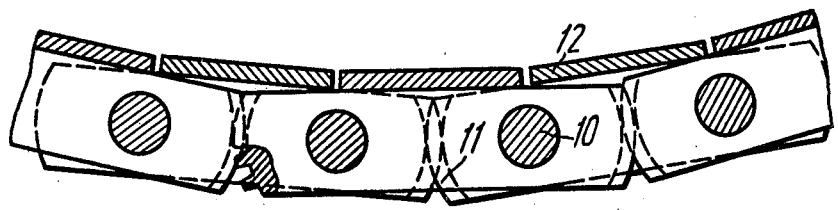
FIG. 3 is a cross-sectional view taken along the line III—III of FIG. 2.

Referring now to FIG. 1, the track of the invention comprises a horizontal section, 1, a curvilinear section 2, and an inclined section 3. The curvilinear section 2 is coupled with the horizontal section 1 by means of a hinge 4, and with the inclined section 3, by means of a hinge 5. Besides, the horizontal section 1 and the inclined section 3 are interconnected by a hinge 6. The inclined section 3 is supported by a jack 7. The curvilinear section 2 of the track is made in the form of a block chain comprising internal plates 8 (FIG. 2) and external plates 9 interconnected by pivots 10 (FIG. 3). The end faces of the plates 8 and 9 are provided with teeth 11 by means of which the internal plates 8 engage one another, and the external plates 9 engage one another respectively. Plates 12 forming a race for the rollers 13 of carriages 14 (FIG. 1) are rigidly attached to the plates 8 and 9.

The distinctive feature of the curvilinear section of the track made in the form of a block chain whose plates engage one another with the teeth is that a turn through a certain angle of one plate with respect to the adjacent one causes all the chain plates to turn through the same angle with respect to the adjacent ones. Such a chain has one degree of freedom: setting of one plate to a certain position dictates a certain position of the other plates. The chain has an initial shape of a portion of the perimeter of a regular polygon inscribed in a circle of radius R, whose value depends upon the distance C between the hinges 4 and 5. When this distance is changed, the chain maintains its shape of a portion of the perimeter of the regular polygon, although inscribed in a circle of another radius $R^1$.

The track operates as follows. The track height (FIG. 1) is varied by the jack 7 which turns the inclined section 3 of the track about the hinge 6 with respect to its horizontal section 1. The central plate 8 (FIG. 2) interconnected with the inclined section 3 by the hinge 5 changes its spatial position. The side plates 9 pivotally coupled with the central plate 8, changes their position as well. A turn of these plates 8 and 9 through a certain angle causes all the other plates 8 and 9 of the curvilinear section 2 to turn through the same angle. As this takes place, the distance C between the hinges 4 and 5 changes i.e. the radius of curvature R of the curvilinear section 2 (FIG. 1) changes. The radius of curvature of the curvilinear section 2 remains constant throughout the length thereof. This ensures a smooth movement of the carriages 14 over the curvilinear section 2.

If this track is used in a vertically adjustable moving stairway where it is necessary to provide a horizontal position of the tread of the stairs during their travel along the whole length of the track, then an additional track should be installed, similar in design to that described above. One track will be used for movement of the main rollers of the stair, while the other, for auxiliary ones. The operation of the additional track is similar and simultaneous with that of the main track.

While a particular embodiment of the invention has been shown and described, various modifications thereof will be apparent to those skilled in the art and therefore it is not intended that the invention be limited to the disclosed embodiment or to the details thereof and the departures may be made therefrom within the spirit and scope of the invention as defined in the appended claims.

What is claimed is:

1. A vertically adjustable conveyor track comprising a horizontal and an inclined sections; a curvilinear section coupling said horizontal and inclined sections; said curvilinear section being made in the form of a block chain; a plurality of rows of plates arranged one after another in said block chain; teeth made in the end faces of said plates, said teeth of plates in each row engaging one another and means for adjusting the inclination of the inclined section relative to the horizontal section.

* * * * *